Figure 1:
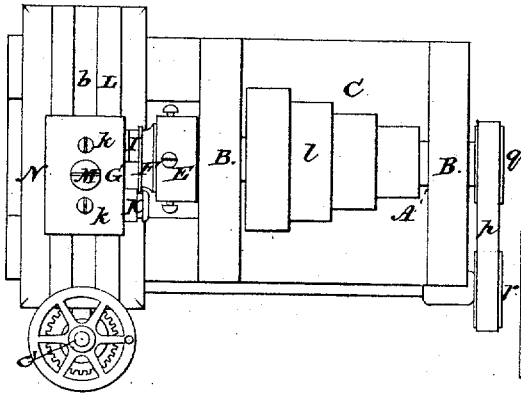

C. E. TROWBRIDGE.

Machines for Manufacturing Rings for Spinning-Machines.

No. 6,115. Reissued Nov. 3, 1874.

*Witnesses:*

Geo. T. Smallwood Jr.
C. Hickenloopes

*Inventor:*

Charles E. Trowbridge
by John J. Halsted
his Atty.

THE GRAPHIC CO. PHOTO-LITH. 39 & 41 PARK PLACE, N.Y.

UNITED STATES PATENT OFFICE.

CHARLES E. TROWBRIDGE, OF WHITINSVILLE, MASSACHUSETTS, ASSIGNOR OF ONE-HALF INTEREST TO ARTHUR F. WHITIN.

IMPROVEMENT IN MACHINES FOR MANUFACTURING RINGS FOR SPINNING-MACHINES.

Specification forming part of Letters Patent No. 133,344, dated November 26, 1872; reissue No. 6,115, dated November 3, 1874; application filed March 11, 1874.

*To all whom it may concern:*

Be it known that I, CHARLES E. TROWBRIDGE, of Whitinsville, in the county of Worcester and State of Massachusetts, have invented an Improvement in Machines for Manufacturing Rings for Spinning-Machines; and I do hereby declare that the following, taken in connection with the drawing which accompanies and forms part of this specification, is a description of my invention sufficient to enable those skilled in the art to practice it.

The invention has particular reference to an organization of mechanism for simultaneously forming the inner and outer grooves of a spinning-machine ring. For this purpose I use, in combination with a rotary chuck for holding and rotating the ring-blank, two cutters at the ends of two stocks or shafts fixed in a carriage having a capability of lateral movement in a plane parallel to the end or face of the ring, the cutters being in the plane of the ring, and so disposed that when one of them (in normal position) is against the outside of the ring, the other is against the inner surface of the ring and diametrically opposite to the other, and so that if the carriage be then moved up, (the chuck and ring being rotated,) the two cutters will simultaneously form the two grooves, the first forming the outer groove and the other the inner groove.

The invention consists, primarily, in this method of forming the two grooves simultaneously, and in the two cutters so combined with the rotary chuck that, as they are fed forward, they simultaneously form the two grooves.

The drawing represents a machine embodying my construction.

Figure 2:
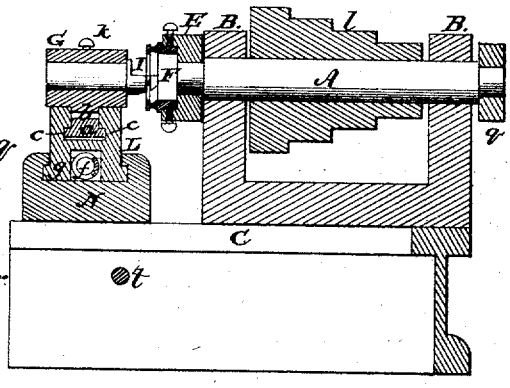
Figure 3:
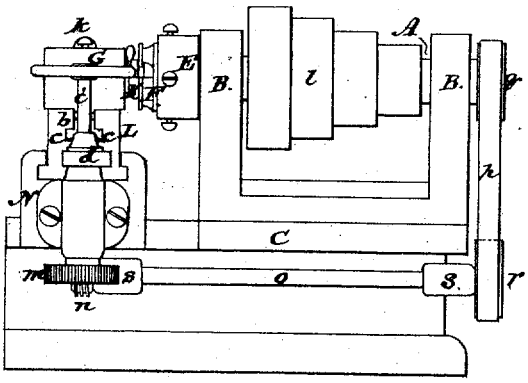
Figure 4:
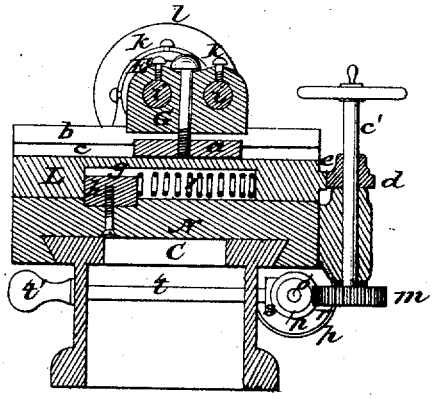

Figure 1 shows the mechanism in plan. Fig. 2 is a vertical longitudinal section of it. Fig. 3 is a side elevation of it. Fig. 4 is a transverse vertical section through the cutter-carrier.

A denotes the main shaft, supported in bearings B B on a bed, C, and having at its inner end a chuck, E, for holding the ring-blank F, the blank being shown as grooved. Before the chuck is a carrier, G, in which are fastened the shanks of the two grooving-cutters I K, each cutter being preferably a solid piece of steel, with a face the periphery or edge of which is of the exact form of the groove to be cut by it. The shanks are relatively so positioned and the cutting-faces so arranged that the two cutting-edges are at the exact distance apart of the outer surface of the blank from the inner surface of the blank diametrically opposite thereto, and they stand in the plane of the grooves to be cut, and against the blank when in position for the operation to commence. The cutter-carrier is mounted upon a carriage, L, to which it may be fastened by a clamp-screw, M, and nut *a*, said nut sliding in grooves *b c*, and the carriage L is supported and slides upon another carriage, N, mounted on the bed C, and made capable of movement toward and from the chuck. The cutters being set and the carrier being fastened to the carriage L, and the carriage N being then slid up toward the chuck until the cutters are in the plane in which the grooves are to be formed, rotation is imparted to the shaft A and its chuck. The carriage L being then moved up to press the cutters against the ring, said cutters pare away the material (as they advance and the chuck rotates) until the grooves are both sunk to the proper depth.

The carriage L may be moved by hand; but the carriage is fed up by mechanism, for which purpose a vertical hand-wheel shaft, *c'*, may be journaled in a bearing at one end of the carriage N, said shaft having a cam, *d*, against which bears a projection, *e*, from the carriage L, the carriage being pressed against the cam by a spring, *f*, and being pressed forward against the stress of the spring by the cam (to bring the cutters into action) as the hand-wheel shaft is rotated. The spring *f* is placed in a chamber, *g*, and bears at one end against the carriage L, and at the opposite end against a piece, *h*, projecting from the carriage N.

Figure 5:
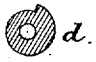

To make the operation wholly automatic the hand-wheel shaft and the chuck-shaft may be connected, for which purpose the shaft *c'* is shown as having a worm-wheel, *m*, into which engages a worm, *n*, on a shaft, *o*, supported in suitable bearings *s*, and connected by a belt, *p*, with the shaft A, the belt running over pulleys *q r* on the two shafts A *o*. The box *s*, adjacent to the worm, is shown as fixed to a slide-rod, *t*, by moving which (by a handle, *t'*) the worm may be engaged with or disengaged from the wheel *m*, as may be desirable. The cam *d* is formed with a shoulder, as seen in Fig. 5, and when the projection *e* passes this shoulder the spring throws back the carriage L, bringing the cutters out from the grooves formed by them, so that the cutters may be drawn back from the ring. The driving-shaft is shown as carrying a series of pulleys, *l*.

I claim—

1. In combination with the rotating ring-holding chuck, a carrier having the two inner and outer cutters adapted to simultaneously form the inner and outer grooves of the rings, substantially as described.

2. The rotary chuck and grooving-cutters, in combination with the worm-shaft *o*, gear-shaft *c'*, cam *d*, and carrier G, adapted to simultaneously and automatically form the inner and outer grooves of the ring, substantially as described.

3. The cam *d* and spring *f*, in combination with the carriage L and the cutter-carrier, arranged for adjustment upon said carriage, substantially as shown and described.

4. In a machine for making rings for spinning-machines, the described mode of forming the inner and outer grooves of the ring by subjecting the outer surface of the blank, and also the inner surface thereof, to the simultaneous action of two cutters affixed to the same sliding stock, one cutter moving in a line toward, and the other in a line from, the axis of the ring.

CHARLES E. TROWBRIDGE.

Witnesses:

H. A. GOODELL,

C. V. DUDLEY.